United States Patent [19]
Endo et al.

[11] Patent Number: 5,143,997
[45] Date of Patent: Sep. 1, 1992

[54] POLYCARBONATE-POLYOL COMPOSITION AND POLYCARBONATE(METH) ACRYLATE COMPOSITIONS AND URETHANE(METH) ACRYLATE COMPOSITIONS PREPARED THEREFROM

[75] Inventors: Toshio Endo; Takaaki Murai; Tatsumi Fujii, all of Hiroshima, Japan

[73] Assignee: Daicel Chemical Industries, Ltd., Osaka, Japan

[21] Appl. No.: 595,423

[22] Filed: Oct. 11, 1990

[30] Foreign Application Priority Data

Oct. 11, 1989 [JP] Japan .................. 1-264513
Dec. 8, 1989 [JP] Japan .................. 1-320050
Dec. 13, 1989 [JP] Japan .................. 1-323071
Sep. 7, 1990 [JP] Japan .................. 2-237316

[51] Int. Cl.$^5$ .................... C08G 18/28; C08F 283/02; C08J 3/28
[52] U.S. Cl. ......................... 528/60; 528/65; 528/66; 528/71; 528/75; 528/80; 528/84; 528/86; 522/135; 522/136; 525/391; 525/451

[58] Field of Search ......... 528/80, 84, 66, 68, 528/75, 60, 65, 71, 86; 522/135, 136; 525/391, 453

[56] References Cited

U.S. PATENT DOCUMENTS 4,483,974 11/1984 Grögler et al. .................. 528/68
4,649,180 3/1987 Chen et al. ..................... 528/84
4,683,280 7/1987 Ukachi et al. ................... 528/75
4,891,421 1/1990 Nishimura et al. ............... 528/85

Primary Examiner—John Kight, III
Assistant Examiner—John M. Cooney, Jr.
Attorney, Agent, or Firm—Morgan & Finnegan

[57] ABSTRACT

A polycarbonate polyol composition which can be used to prepare polycarbonate(meth)acrylate and urethane(meth)acrylate compositions is obtained by the ester interchange reaction of a polycarbonate diol composition with a triol and/or tetraol. The (meth)acrylate compositions have excellent photo and electron beam curability and the cured layers prepared therefrom have excellent heat resistance under moisture conditions.

8 Claims, No Drawings

POLYCARBONATE-POLYOL COMPOSITION AND POLYCARBONATE(METH) ACRYLATE COMPOSITIONS AND URETHANE(METH) ACRYLATE COMPOSITIONS PREPARED THEREFROM

FIELD OF THE INVENTION

The present invention relates to a polycarbonate-polyol composition, a polycarbonate(meth)acrylate composition obtained from the polycarbonate-polyol composition, a urethane(meth)acrylate composition obtained from the polycarbonate-polyol composition, and manufacturing processes therefor. The polycarbonate(meth)acrylate composition and the urethane(meth)acrylate composition are useful for photo-curable compositions for coatings.

BACKGROUND OF THE INVENTION

Hitherto, polyurethane resins have been used in a wide variety of forms including foams, adhesives, fibers, soft or rigid elastomers, ink binders, synthetic leathers and paints.

They are mainly prepared by the reaction of an organic diisocyanate compound with polyol compounds.

The polyol compounds which have been employed include polyether polyols such as polypropylene glycols, polytetramethylene glycols, polyester polyols which are derived from a divalent carboxylic acid such as adipic acid, and a polyhydric alcohol or a polylactone-polyol which is obtained by the reaction of a lactone monomer with an alcohol.

A variety of polyol compounds have been used to produce polyurethane resin which is used for many kinds of purposes.

However, as polyether polyols have ether bonds, the urethane resin which is produced employing them has the disadvantage of being poor in heat resistance and in outdoor durability.

The urethane resin which is produced by employing polyester or polylactone-polyols has the disadvantage of being poor in water resistance, thought to be due to presence of ester bonds.

The use of polyols having carbonate bonds in the molecular structure has been proposed to produce novel urethane resins which overcome the foregoing disadvantages.

The polycarbonate-polyols which are used more widely than any other type of polyol compound is the polyol having a carbonate bond in the molecular structure containing 1,6-hexanediol in the main chain of the molecular structure, as shown by formula (I):

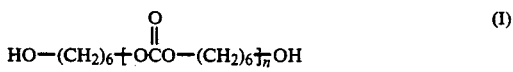

(I)

The polycarbonate-diol having 1,6-hexanediol structures in the main chain can produce a polyurethane resin having a very good balance of various properties, including mechanical strength, excellent resistance under high heat and moisture conditions, etc., thereby maintaining a good balance of properties, and has also the advantage of being easy to produce on an industrial basis.

Furthermore, it is known that a urethane resin having an improved mechanical strength can be prepared from a diol mixture composed of 1,6-hexanediol containing cyclohexane dimethnol.

Still further, German Patent No.1921866 and 1770618 teach that a polycarbonate-polyol composition with which a urethane polymer having high density and high tenacity is prepared by a reaction with a diisocyanate compound, can be prepared by an ester interchange reaction of a mixture composed of a diol and a triol with an aliphatic or aromatic carbonate compound.

In addition, Japanese Examined Application Publication (Kokoku) No. 39650/1982 [entitled: A process for preparing a polycarbonate-triol]teaches a process for preparing a polycarbonate-triol being liquid at room temperatures.

The process comprises an ester interchange reaction of an aromatic carbonate compound with a primary aliphatic triol (for example, trimethylolpropane or trimethylolethane) and an aliphatic or alicyclic diol.

However, the polycarbonate-polyol composition prepared by the ester interchange reaction of the aromatic carbonate compound with the mixture composed of the diol and triol contains not only a free aromatic alcohol, but also by-produced phenyl terminated-polycarbonate compounds.

It has been pointed out that a polyurethane resin prepared by the reaction of the polycarbonate-polyol composition with a diisocyanate compound does not exhibit sufficient properties because of the by-products.

In the case that a polycarbonate-polyol composition is prepared by the ester interchange reaction of an aliphatic carbonate compound with the mixture composed of the diol and triol, an aliphatic alkyl-terminated polycarbonate compound is by-produced.

The polycarbonate prepared by the polycarbonate-polyol composition containing the aliphatic alkyl-terminated polycarbonate compound does not exhibit sufficient properties.

The Japanese Patent Application Publication (Kokoku) No.1978/42359 [corresponding to US 4,013,702--entitled:Process for the purification of Polycarbonates] teaches that a polycarbonate-polyol composition can be refined by adding water thereto.

Presently it is desireable that coating compositions be of the low pollution type, or be of a valuable components saving type and or of an energy saving type.

A specific example of successful coating compositions having these advantages is a ultraviolet-radiation curable type.

This type coating composition contains a ultra violet-radiation curable compound having at least two acryl or methcryl groups, a polymerizable monomer and various additives.

This type coating composition contains practically no volatile components such as solvents and, only partially contains polymerizable monomers which function as a reactive diluent to form protective coating layer together with ultraviolet-radiation curable main components.

Still further, an electron-beam curable coating composition can be cured as well as the ultraviolet-radiation curable composition without a photo-initiator, or a photo-sensitizer.

Such ultraviolet-radiation curable or electron-beam curable coating compositions have been used in the fields of coatings, adhesives, vehicles for a printing ink, a solder resist ink, materials for anastatic printings, linings for a mortar floor, coatings for PVC tiles and outer coatings for optical glass fibers or plastic molds.

Fundamental properties of the cured articles(specifically, coating layers, inks, films) depend remarkably upon the type of photo (ultraviolet-radiation or electron-beam) curable prepolymer which is the base-resin.

SUMMARY OF THE INVENTION

It is a primary object of the present invention to provide a polycarbonate-polyol composition from which an excellent polyurethane resin, a polycarbonate(meth)acrylate composition and a urethane(meth)acrylate composition, etc., can be produced.

It is another object of the present invention to provide a polycarbonate(meth)acrylate composition, a urethane(meth)acrylate composition, and manufacturing processes therefor.

Also, the present polycarbonate-polyol composition can provide a polycarbonate(meth)acrylate composition, which can be used as a main component of a photo-curable coating composition.

The photo-curable coating composition can be prepared by mixing the main component with a variety of polymerizable monomers, a photopolymerization-initiator, a photo-sensitizer, a coloring agent, other additives (ex. a thickening agent, an antioxidant, a polymerization-inhibitor, a wetting agent, a dispersing agent, a drying agent, etc.), and can be used as a coating composition, an adhesive, a coating material for optical glass fibers, etc.

The photo-curable prepolymer composition has the advantages of excellent heat resistance under moisture conditions, and excellent photo-curability (having lower anaerobic property).

Additionally, the present polycarbonate-polyol composition can provide the present urethane(meth)acrylate composition, which also can be used as a main component of a photo-curable composition for coatings as well as a polycarbonate(meth)acrylate composition.

DETAILED DESCRIPTION OF THE INVENTION

The present invention will now be described hereinafter in more detail. The present polycarbonate-polyol composition can be produced by the ester interchange reaction of a polycarbonatediol(a diol) composition with a compound having three hydroxyl groups(a triol) and/or a compound having four hydroxyl groups(a tetraol).

The product of the ester interchange reaction is desirably a homogeneous reaction mixture composed of the diol components (that is, a polycarbonate-diol composition, a primary aliphatic diol and or an alicyclic diol) and the triol components (that is, a polycarbonate-triol composition, a primary aliphatic triol) and/or the tetraol components (that is, a polycarbonate-tetraol composition, a primary aliphatic tetraol), as shown by following formulae:

(a)DI+(b)TRI+(c)TETRA→(a +b +c)BLEND (OH)$_f$

[wherein DI represents the starting polycarbonate-diol composition, TRI represents the triol compound, TETRA represents the tetraol compound, BLEND represents the resulting esterified reaction mixture, (a), (b) and (c) represent the mole number of the starting DI, TRI and TETRA, respectively, f in (OH)$_f$ represents the average hydroxyl number(a functional group number) of the mixture obtained in the ester interchange reaction].

(a), (b), (c) and the number average molecular weight of the each polyol, etc., are mutually related by the following formulae (1), (2) and (3):

$$2(a)+3(b)+4(c)=f(a+b+c) \quad (1)$$

$$(a)\text{M-di}+(b)\text{M-tri}+(c)\text{M-tetra}=(z) \quad (2)$$

$$(z)=\text{M-blend}(a+b+c) \quad (3)$$

[wherein M-di represents the number average molecular weight of the starting polycarbonate-diol composition (DI), M-tri represents the number average molecular weight of the resulting polycarbonate-triol composition (TRI), M-tetra represents the number average molecular weight of the resulting polycarbonatetetraol composition (TETRA), M-blend represents the number average molecular weight of the resulting polycarbonate-polyol composition obtained in the ester interchange reaction, (z) represents the total weight[gram] of BLEND].

Furthermore, the number average molecular weight(M-blend) of the resulting polycarbonate-polyol mixture (BLEND) obtained in the ester interchange reaction and the molar ratio of (b) to (c) are represented by the following formulae (4) and (5):

$$(b)/(c)=(X) \quad (4)$$

In the case that (c) is greater than 0 in the formula (4):

$$\text{M-blend} = \frac{\{(X)(3-f)+(4-f)\}M\text{-di}+\{(X)M\text{-tri}+M\text{-tetra}\}(f-2)}{(X)+2} \quad (5)$$

In the case that (c) is 0 in the formula (4):

$$\text{M-blend}=(3-f)\text{M-di}+(f-2)\text{M-tri} \quad (6)$$

In addition, the following formulae (7) to (10) can be derived from the above described formulae (1) to (4).

In the case that (c) is greater than 0 in the formula (4):

$$(a)=\frac{[(X)(3-f)+(4-f)]\times(b)}{(X)(f-2)} \quad (7)$$

In the case that (c) is 0 in the formula (4):

$$(a)=\frac{[(X)(3-f)+(4-f)]\times(b)}{(X)(f-2)} \quad (8)$$

In the case that (c) is greater than 0 in the formula (4):

$$(z)=\frac{\text{M-blend}\times[(X)+2]\times(a)}{(X)(3-f)+(4-f)} \quad (9)$$

In the case that (c) is 0 in the formula (4):

$$(z)=\frac{\text{M-blend}\times(a)}{(3-f)} \quad (10)$$

As mentioned hereinabove, the mole number(a) of the starting polycarbonate-diol composition, the mole number(b) of the starting triol compound and the mole number(c) of the starting tetraol compound to be used and the average functional group number(f) (hydroxyl number) of the resulting polycarbonate-polyol composition can be calculated by setting the each number average molecular weight M-di, M-tri and M-tetra and by setting the (b)/(c) molar ratio (X) and the total weight (z) [gram] of the resulting polycarbonate-polyol composition (BLEND) using the formulae (5) to (10).

The starting polycarbonate-diol composition (DI) to be used in the present invention, in which alkylene groups are bonded between carbonate units in the main molecular chain, can be produced by well-known processes(a phosgene process, a chloroformate process, an ester interchange reaction process using an aliphatic carbonate or aromatic carbonate) by the reaction of an alkyl carbonate or an alkylene carbonate, etc., with the diol compounds described hereinafter.

Specific examples of diol compounds include diethylene glycol, triethylene glycol, tetraethylene glycol, tripropylene glycol, polypropylene glycol, etc., ethylene glycol, 1,2-propanediol, 1,3-butanediol, 2-methyl-1,3-butanediol, neopentyl glycol, neopentylglycol hydroxypyvalate, 2-methylpentanediol, 3-methylpentanediol, 2,2,4-trimethyl-1,6-hexanediol, 3,3,5-trimethyl-1,6-hexanediol, 2,3,5-trimethylpentanediol, 1,6-hexanediol, etc.

Specific examples of the starting triol compound(-TRI) to be used in the present invention include a primary aliphatic triol such as trimethylol propane or trimethylol ethane and or glycerine, etc.

Specific examples of the starting tetraol compound-(TETRA) to be used in the present invention include a primary aliphatic tetraol such as pentaerythritol, etc., or ditrimethylol propane.

The molar ratio (X) [=(b)/(c)]of the starting triol compound to the starting tetraol compound, which is described in the forgoing formula(4), is preferably more than 1.25.

When the molar ratio is less than 1.25, the resulting polycarbonate-polyol composition, which is the intended product, is undesirably not homogeneous.

Furthermore, M-blend, which is the number average molecular weight of the resulting polycarbonate-polyol composition, is preferably more than 300.

When the M-blend is less than 300, the resulting polycarbonate-polyol composition contains a relatively large amount of the monomer diol components, monomer triol components and monomer tetraol components, which may adversely affect various properties, for example, a photo-curability, in a urethane derived from the polycarbonate-polyol composition.

The ester interchange reaction can be carried out by wellknown ester interchange reaction processes in the presence of conventional catalyst.

Specific preferable examples of ester interchange reaction catalysts include a metal such as lithium, sodium, potassium, rubidium, cesium, magnesium, calcium, strontium, barium, zinc, aluminum, titanium, cobalt, germanium, tin, lead, antimony, arsenic and cerium, and alkoxides thereof, etc.

Furthermore, other examples of more preferable catalysts include a carbonate of an alkali metal or an alkaline earth metal, zinc borate, zinc oxide, lead silicate, lead arsenate, lead carbonate, antimony trioxide, germanium dioxide, cerium trioxide and aluminum isopropoxide.

Still further, the examples of the most preferable catalysts include an organic metal compound such as a magnesium salt, a calcium salt, a cerium salt, a barium salt, a zinc salt, a titanium salt and a tin salt of an organic acid, respectively.

The amount of the catalysts used is preferably from 0.0001 to 1.0 %, more preferably from 0.01 to 0.2 % based on the total starting materials.

The ester interchange reaction is specifically carried out as described hereinafter.

That is, the starting polycarbonate-diol composition, the starting triol compound, the starting tetraol compound and the catalyst are mixed in a reactor containing nitrogen gas at temperatures of from about 150 to 240 ° C., for a reaction period of about from 5 to 1 hours by heating while stirring.

When the reaction temperature is less than 150 ° C., an ineffectively long ester interchange reaction period is required.

On the other hand, when the temperature is more than 240° C., undesirable by-products (ether compounds, etc.) can be produced in the product mixture.

The number average molecular weight of the resulting polycarbonate-polyol ccmposition can be adjusted by a mixing molar ratio between the starting polycarbonate-diol composition, the starting triol compound and the starting tetraol compound, and a combination of the starting materials.

The present polycarbonate(meth)acrylate composition can be produced by the reaction of the above described present polycarbonate-polyol composition with acrylic acid or methcrylic acid.

The mixing ratio of the starting materials in the reaction is preferably from about 1 mole to 10 mole of acrylic acid or methcrylic acid based on mole of the polycarbonate-polyol composition.

When the mixing ratio is 1/1, one of a plurality of hydroxyl groups in a molecule can be replaced with acrylic group or methcrylic group because of the polycarbonate-polyol composition having at least 2 hydroxyl groups.

When the mixing ratio is f/1 (wherein f is the number of the hydroxyl groups in a molecule of the polycarbonate-polyol composition), every hydroxyl group can be replaced with a acrylic group or methcrylic group.

The excess amount of acrylic acid or methcrylic acid should be preferably removed after completion of the reaction.

When the mixing ratio is less than 1/1, that is, when being small amount of acrylic acid or methcrylic acid, the resulting polycarbonate(meth)acrylate composition has a undesirable ultraviolet-radiation curability.

On the other hand, when the mixing ratio is more than f/1, that is, when being excess amount of acrylic acid or methcrylic acid, there is required costs for the removal thereof.

The reaction of the polycarbonate-polyol composition with acrylic acid or methcrylic acid is carried out in accordance with a conventional esterification reaction as described hereinafter.

For example, the polycarbonate-polyol composition, acrylic acid or methcrylic acid, an azeotropic solvent for dehydration, an esterification catalyst, and a polymerization-inhibitor are mixed in a reactor, followed by heating while stirring.

The water generated in the esterification reaction is entrained by an azeotropic distillation with the azeotropic solvent out of the reactor, followed by cooling the reaction product after completion of dehydration.

In succession, the reaction product is washed with an alkaline water solution and an inorganic salt water solution, followed by removing the azeotropic solvent under the reduced pressure.

On dehydration and washing with water, the polymerizationinhibitor may be further added.

The residual product in the reactor is the present polycarbonate(meth)acrylate composition, can be optionally applied with or without refining, for example, by absorption with activated carbon or activated alumina, etc.

Specific preferable examples of the esterification reaction catalyst include sulfuric acid, hydrochloric acid, benzene sulfonic acid, p-toluene sulfonic acid, etc.

Specific preferable examples of the polymerization-inhibitor include hydroquinone, p-benzoquinone, p-tert-butylcatechol, diphenylamine thiosemicarbazide, sulfur, phenothiazine, hydroquinone monomethylether, etc.

The azeotropic solvent for dehydration is preferably stable chemically in the reaction mixture, insoluble in water, and capable of forming an azeotropic mixture with water.

Specific preferable examples of azeotropic solvents include, for example, cyclohexane, benzene, toluene, n-hexane, trichloroethylene, isopropylether, etc.

The dehydration temperatures are preferably in the range of from 80 to 120° C. depending upon the amount and the kind of the azeotropic solvent to be used.

The present urethane(meth)acrylate composition can be produced by the reaction of the above described present polycarbonate-polyol composition with an ethylenically unsaturated mono isocyanate obtained by the reaction of a hydroxyl alkyl(meth)acrylate with an organic diisocyanate.

The mixing molar ratio of the hydroxyl alkyl(meth)acrylate to the organic diisocyanate is preferably 1/1 in the present invention.

The reaction temperatures are preferably the range of from 10 to 90 ° C., more preferably from 40 to 60 ° C., which are conventionally used in the well known reaction.

Preferable examples of the hydroxyl alkyl(meth)acrylate to be used in the present invention include 2-hydroxyethylacrylate or 2-hydroxyethylmethcrylate, hydroxypropylacrylate or hydroxypropylmethcrylate, hydroxypentylacrylate or hydroxypentylmethcrylate, etc.

2-hydroxyethylacrylate or 2-hydroxyethylmethcrylate is most preferable.

Preferable examples of the organic diisocyanate to be used in the present invention include a commercial mixture composed of tolylenediisocyanate, hexamethylenediiscyanate, diphenylmethne-4,4'-diisocyanate, xylenediisocyanate, isophoronediisocyanate, etc.

Isophoronediisocyanate is most preferable because of an excellent outdoor durability and a property of being much more reactive in one isocyanate group than the other isocyanate group.

The ethylenically unsaturated monoisocyanate can be readily prepared by the difference of the reactivity.

Well known urethanation catalysts such as amines, tin compounds, and or metal acetylacetonate complexes, etc., may be used in the urethanation reaction of the hydroxyl alkyl(meth)acrylate with the organic diisocyanate.

Specific examples of the catalysts include triethylene diamine, morpholine, M-ethyl morpholine, piperidine, triethanol amine, triethyl amine, dibutyl tin laurate, primary tin octate, primary tin laurate, primary tin oleate, primary tin torate, dibutyl tin oxide, etc.

The molar ratio of the ethylenically unsaturated mono isocyanate with the polycarbonate-diol or -triol in the present invention, is preferably f/1 (f is number of hydroxyl groups in one mole of the polycarbonate-diol or -triol).

The urethanation reaction temperatures are preferably in the range of from 60 to 90° C., which are conventionally used in the well-known reaction method.

The use of the catalysts is optional in the above described urethanation reaction.

The urethane(meth)acrylate composition according to the present invention, also can contain ethylenically unsaturated liquid compounds which act as a diluent solvent for the purpose of lowering the viscosity of the composition in the case of application to a photo-curable coating composition.

Examples of the ethylenically unsaturated liquid compounds include for example, 2-hydroxyethyl acrylate, phenoxyethyl acrylate, isobornyl acrylate, styrene, vinyl pyrrolidone, tetrahydrofurfuryl acrylate, etc.

The diluent solvents are preferably used in the content of from 10 to 60 %, more preferably from 20 to 40 %, based on the total weight of the photo-curable composition.

Although a polyfunctional diluent solvent such as trimethylolpropane triacrylate can also be used depending upon the purposes of use thereof, the above described monoethylenically unsaturated diluents are more preferably used for the purpose of maintaining a remarkable coexistence of strength and extension in coating layers.

In the case that the urethane (meth)acrylate composition according to the present invention is applied to a photo-curable coating composition, a photo-sensitizer can optionally be used.

Examples of the photo-sensitizer include a ketone type photo-sensitizer such as benzophenone, diethoxy acetophenone, etc., benzoin ether type photo-sensitizer such as benzoin butyl ether or benzoin methyl ether, etc.

The present invention is illustrated below by Examples, Comparative Examples, Application Examples, and Comparative Application Examples.

EXAMPLE 1 preparation of a polycarbonate-polyol composition of the present invention

A four-necked and round-bottom flask having a capacity of 2 liters equipped with a stirrer, a thermometer, a tube for supplying nitrogen gas and a condenser for cooling was charged with 1566.3g(0.7788 mole) of a polycarbonate-diol composition having a molecular weight of 2011 and a hydroxyl number of 55.8 ["CD 200" manufactured by Daicel Chemical Industries, Ltd.], 327.2 g(2.4069 mole) of trimethylol propane (as a triol compound), 106.0 g(0.7900 mole) of pentaerythritol(as a tetraol compound) and 0.08 g of tetrabutyl titanate as a catalyst, followed by stirring and heating at atmospheric pressure.

The temperature of the above described mixture composed of the starting materials was gradually raised to about 220° C., followed by reacting (an ester exchange reaction) for 8 hours.

Several sampling operations were carried out to analyze quantitatively a diol component (resulting 1,6-hexanediol generated from the starting polycarbonate-diol composition), a triol component( starting trimetylolpropane) and a tetraol compound(starting pentaerythritol) by gaschromatography analysis for the purpose of detecting an equilibrium in the ester interchange reaction.

The obtained polycarbonate-polyol composition exhibited a hydroxyl value of 337.0 and a glass transition temperature of $-70°$ C., and was a liquid in ordinary temperatures.

EXAMPLE 2 to 6 preparation of a polycarbonate-polyol composition of the present invention

The same procedures as described in Example I were repeated, except that charged amount of the starting materials and catalyst were varied as shown in Table-1.

The properties of the resulting polycarbonate-polyol compositions are shown in Table-2.

EXAMPLE 7 to 8 preparation of a polycarbonate-polyol composition prepared using a small ratio of a triol compound/a tetraol compound The same procedures as described in Example 1 were repeated, except that charged amount of the starting materials were varied as shown in Table-1. The properties of the resulting polycarbonate-polyol composition are shown in Table-2.

The concentrations of alkyl groups at terminal positions were all 0.1 mole % based on the total terminal groups in Example 1 to 8.

COMPARATIVE EXAMPLE 1 preparation of a polycarbonate-polyol composition prepared without the present polycarbonate-diol composition The same procedures as described in Example 1 were repeated, except that 796.8 g (8.8455 mole) of dimethylcarbonate, 134.2 g (1.0000 mole) of trimethylolpropane, 709.1 g (6.0000 mole) of 1,6-hexanediol and 0.164 g of tetrabutyl titanate as a catalyst were used.

The temperature of the above described mixture composed of the starting materials was gradually raised to an initiation of total reflux, followed by reacting for about 1 hours while maintaining the total reflux.

Further, the reaction was carried out while entraining an azeotropic mixture composed of dimethylcarbonate/methnol under a constant reflux ratio of 5(R/D), followed by maintaining the reaction to finish of entraining the azeotropic mixture under atmospheric pressure.

The temperature was gradually raised to about 200° C. under atmospheric pressure, followed by reacting for 15 hours at that temperature.

In succession, the reaction was succeeded under reduced pressures of about from 5 mm Hg to 20 mm Hg and that temperature for 10 hours for the purpose of removal of unreacted lower distillates to obtain a polycarbonate-polyol composition.

The properties of the resulting polycarbonate-polyol composition are shown in Table-2.

The concentration of alkyl groups at terminal positions was 16.4 mole % based on the total terminal groups.

It is noted that the qualitative measurcments of the concentration of alkyl groups at terminal positions were carried out with an NMR equipment (GX-270 manufactured by Nihon Denshi, Ltd.) having high resolving power, in Example 1 to 8 and Comparative Example 1.

EXAMPLE 9 preparation of a polycarbonate acrylate composition of the present invention

A four-necked and round-bottom flask equipped with a stirrer, a thermometer, a tube for supplying nitrogen gas and a condenser for cooling was charged with 500g(1.0 mole) of the polycarbonate-polyol composition obtained in Example 1, 360 g (5.0 mole) of acrylic acid, 5.0 g of p-toluene sulfonic acid as a catalyst, 200 g of benzene as an azeotropic solvent and 0.7 g of hydroquinone monomethylether as an inhibitor, followed by an esterification reaction during dehydration under reflux of benzene.

The reaction was completed at finish of water distillation.

After the completion of the esterification reaction, the reaction product was washed with benzene/water mixture to remove unreacted acrylic acid, followed by distillation of benzene under reduced pressure to obtain a polycarbonate acrylate composition.

The polycarbonate acrylate composition exhibited a viscosity of 5000 cp (25° C.), an acid value of 0.2 and was a yellow-brown liquid.

COMPARATIVE EXAMPLE 2 preparation of a polycaprolactone-polyol acrylate composition

The same procedures as described in Example 9 were repeated, except that a polycaprolactone-polyol composition having a molecular weight of 500 and three functional groups ["PCL-305" manufactured by Daicel Chemical Industries, Ltd.]was used in place of the polycarbonate-polyol composition to obtain a polycaprolactone-polyol acrylate composition.

COMPARATIVE EXAMPLE 3 preparation of a polyether-polyol acrylate composition

The same procedures as described in Example 9 were repeated, except that a polyether-polyol composition ["ADEKA-POLYETHER" manufactured by Asahi-Denka Industries, Ltd.]was used in place of the polycarbonate-polyol composition to obtain a polyetherpolyol acrylate composition.

APPLICATION EXAMPLE 1 a photo-curability test of the polycarbonate acrylate composition obtained in Example 9

The polycarbonate acrylate composition obtained in Example 9 was mixed with trimethylolpropane triacetate as a conventional diluent, a photo-sensitizer("Irgacure 184" supplied by Ciba-Geigy, Ltd.), followed by being coated on an iron plate and a releasing paper with a thickness of 15 microns, 150 microns, respectively, and being exposed to ultraviolet-radiation, to obtain a cured coating layer.

The tackiness test (time required to disappearance of tackiness on the layer by finger touching after exposing to the ultraviolet-radiation radiated from a mercury vapor lamp having a power output of 80 W/cm) was carried out with the cured layer on the iron plate. The result is shown in Table-4.

COMPARATIVE APPLICATION EXAMPLE 1

The same procedures as described in Application Example 1 were repeated, except that the polycaprolactone-polyol acrylate composition obtained in Comparative Example 2 was used in place of the polycarbonate-polyol acrylate composition. The result is shown in Table-4.

COMPARATIVE APPLICATION EXAMPLE 2

The same procedures as described in Application Example 1 were repeated, except that the polyether-polyol acrylate composition obtained in Comparative Example 3 was used in place of the polycarbonate-polyol acrylate composition. The result is shown in Table-4.

EXAMPLE 10 synthesis of a urethane alkyl(meth)acrylate composition of the present invention

[1] synthesis of an ethylenically unsaturated mono isocyanate

A five-necked and round-bottom flask having a capacity of 5 liters equipped with a stirrer, a thermometer, a tube for supplying air, a condenser for cooling and a funnel for adding dropwise was charged with 2220 g of isophrone diisocyanate and 6.76 g of dibutyl tin dilaurate, followed by raising to 60° C. and maintaining the temperature under air atmosphere.

Subsequently, 1160 g of 2-hydroxyl ethyl acrylate was charged into the flask while maintaining at 60° C. by adding dropwise from the funnel for about 2 hours. After completion of dropwise addition, the reaction was additionally carried out while maintaining at 60° C. for about 5 hours, while measuring the decrease of hydroxyl groups of 2-hydroxyl ethyl acrylate in the resulting product by an infrared spectroscopy.

After disappearance of hydroxyl groups, 3380 g of an ethylenically unsaturated monoisocyanate was obtained.

[2] synthesis of a urethane alkyl(meth)acrylate composition

A five-necked and round-bottom flask having a capacity of 5 liters equipped with a stirrer, a thermometer, a tube for supplying air, a condenser for cooling and a funnel for adding dropwise was charged with 1000 g (2.0 mole) of the polycarbonatepolyol composition obtained in Example 1 and 500 g of methyl ethyl ketone, followed by raising to 80° C.

Subsequently, 2712 g of the ethylenically unsaturated monoisocyanate obtained in the above reaction [1] was added dropwise while maintaining at a reaction temperature (not higher than 80° C.) from the funnel for 4 hours.

After completion of dropwise addition, the reaction was additionally carried out while maintaining at 80° C. for about 5 hours, while measuring the decrease of NCO groups of the ethylenically unsaturated monoisocyanate in the resulting product by an infrared spectroscopy.

The reaction was stopped at a point of time when less than 0.01% of NCO contents was indicated.

In succession, methyl ethyl ketone was removed under reduced pressure to obtain 3700 g of a photo-curable urethane hydroxyethyl acrylate composition having a viscosity of 12000 cps at 25° C.

COMPARATIVE EXAMPLE 4 preparation of a composition consisting essentially of a urethane alkyl(meth)acrylate composition obtained from a polyester-polyol composition The same procedures as described in Example 8 were repeated, except that a polyester-polyol polyester["PCL 305" manufactured by Daicel Chemical Industries, Ltd.]was used in place of the polycarbonate-polyol composition.

COMPARATIVE EXAMPLE 5 preparation of a composition consisting essentially of a urethane alkyl(meth)acrylate composition from a polyether-polyol composition The same procedures as described in Example 8 were repeated, except that a polyether-polyol composition ["ADEKA POLYOL G-400" manufactured by Asahi Denka, Ltd.]was used in place of the polycarbonate-polyol composition.

APPLICATION EXAMPLE 2 a photo-curability test of urethane alkyl(meth)acrylate composition obtained in Example 8

The urethane alkyl(meth)acrylate composition obtained in Example 8 was mixed with trimethylolpropane triacrylate as a conventional diluent monomer, a photo-sensitizer("Ir gacure I84" supplied by Ciba-Geigy, Ltd.), followed by being coated on an iron plate and a releasing paper with a thickness of 15 microns, 150 microns, respectively, and being exposed to UV radiation, to obtain the cured coating layer.

The result is shown in Table-4.

COMPARATIVE APPLICATION EXAMPLE 3

The same procedures as described in Application Example 2 were repeated, except that the urethane alkyl(meth)acrylate composition obtained in Comparative Example 4 was used.

The result is shown in Table-4.

COMPARATIVE APPLICATION EXAMPLE 4

The same procedures as described in Application Example 2 were repeated, except that the urethane alkyl(meth)acrylate composition obtained in Comparative Example 5 was used.

The result is shown in Table-4.

While the invention has been described in detail and with reference to specific embodiments thereof, it will be apparent to one skilled in the art that various changes and modifications can be made therein without departing from the spirit and scope thereof.

TABLE 1

| Starting Materials | | 1 | 2 | 3 | 4 | 5 | 6 | 7 | 8 |
|---|---|---|---|---|---|---|---|---|---|
| CD 220S-JG-1 | (g) | 1566.3 | 1602.9 | 1608.4 | 1561.1 | 1780.1 | 1853.2 | 1781.7 | 1853.5 |
| | (mole) | 0.7788 | 0.797 | 0.8296 | 0.7762 | 0.8852 | 0.9215 | 0.8859 | 0.9216 |
| TMP | (g) | 327.7 | 148.37 | 99.09 | 434.23 | 214.52 | 141.28 | 97.7 | 21 |

TABLE 1-continued

| Starting Materials | | 1 | 2 | 3 | 4 | 5 | 6 | 7 | 8 |
|---|---|---|---|---|---|---|---|---|---|
| PET | (mole) | 2.4069 | 1.0898 | 0.7278 | 3.1893 | 1.5756 | 1.0377 | 0.7176 | 0.1542 |
| | (g) | 106 | 48.74 | 32.55 | 0 | 0 | 0 | 120.6 | 125.5 |
| TBT | (mole) | 0.79 | 0.3632 | 0.2426 | 0 | 0 | 0 | 0.8988 | 0.9353 |
| | (g) | 0.08 | 0.064 | 0.064 | 0.08 | 0.08 | 0.08 | 0.08 | 0.08 |
| calculated functionality | (f) | 3.00 | 2.80 | 2.65 | 2.80 | 2.63 | 2.52 | 3.00 | 3.00 |
| TMP/PET | | 3.05 | 3.00 | 3.00 | ∞ | ∞ | ∞ | 0.80 | 0.16 |

TMP: trimethylolpropane
PET: pentaerythlytol
TBT: tetrabutyl titanate

TABLE 2

| | Example | | | | | | | | Comparative |
|---|---|---|---|---|---|---|---|---|---|
| | 1 | 2 | 3 | 4 | 5 | 6 | 7 | 8 | Example |
| molecular weight (approximately) | 500 | 800 | 1000 | 500 | 800 | 1000 | 800 | 1000 | 1000 |
| outer appearance (at 80° C.) | clear | clear | slightly unclear | clear | clear | clear | unclear | unclear | clear |
| colorness (APHA) | 100 | 100 | 90 | 70 | 80 | 80 | — | — | 45 |
| acid value (mg KOH/g) | 0.154 | 0.075 | 0.106 | 0.277 | 0.297 | 0.201 | 0.496 | 0.066 | 0.279 |
| water contents (%) | 0.020 | 0.021 | 0.021 | 0.009 | 0.031 | 0.027 | 0.02 | 0.02 | 0.02 |
| hydroxyl value (mg KOH/g) | 337.0 | 198.2 | 153.3 | 320.1 | 185.4 | 145.6 | 221.7 | 180.4 | 186.6 |
| viscosity (CP/60° C.) | 313.0 | 607.2 | 757.5 | 256.2 | 512.4 | 677.8 | 513 | 743 | 46.1 |
| melting point (°C.) | — | 6.3 | 10.8 | — | 2.5 | 7.5 | 2.0 | 8.5 | — |
| Tg (°C.) | −66.0 | −61.7 | −61.5 | −67.0 | −63.8 | −64.0 | −64.2 | −62.5 | — |
| terminal alkyl group contents (%) | 0.1 | 0.1 | 0.1 | 0.1 | 0.1 | 0.1 | 0.1 | 0.1 | 16.4 |

TABLE 3

| Starting Materials | | |
|---|---|---|
| 1,6-hexane diol | (g) | 709.1 |
| | (mole) | 6.0000 |
| TMP | (g) | 134.2 |
| | (mole) | 1.0000 |
| DMC | (g) | 796.8 |
| | (mole) | 8.8455 |
| TBT | (g) | 0.164 |
| calculated functionality | (f) | 3.00 |
| triol/tetraol | | ∞ |

TMP: trimethylolpropane
DMC: dimethyl carbonate
TBT: tetrabutyl titanate

TABLE 4

| | Application Example | | Comparative Application Example | | | |
|---|---|---|---|---|---|---|
| | 1 | 2 | 1 | 2 | 3 | 4 |
| modified acrylate resin | 80 | 75 | 80 | 80 | 75 | 75 |
| Trimethylol propane triacetate | 20 | 25 | 20 | 20 | 25 | 25 |
| Photo-sensitizer | 3 | 3 | 3 | 3 | 3 | 3 |
| tackiness test (second) | 2 | 5 | 8 | — | — | |
| retention ratio of tensile strength (121° C., RH: 95%, 48 hours) | 85 | 80 | 10 | 30 | 8 | 24 | photo-sensitizer: Irgacure 184 (manufactured by Ciba-Geigy, Ltd.)

We claim:

1. A polycarbonate-polyol composition obtained by the ester interchange reaction of a polycarbonate-diol composition with a compound having three hydroxyl groups, a compound having four hydroxyl groups or mixtures thereof.

2. A polycarbonate-polyol composition according to claim 1, wherein the polycarbonate-diol composition is obtained from the reaction of an alkyl carbonate or an alkylene carbonate with a diol.

3. A polycarbonate-polyol composition according to claim 1, wherein the compound having three hydroxyl groups is a primary aliphatic triol.

4. A polycarbonate-polyol composition according to claim 1, wherein the compound having four hyroxyl groups is a primary aliphatic tetrol.

5. A polycarbonate(meth)acrylate composition comprising the reaction product of hydroxyl groups in a polycarbonate-polyol composition according to claim 1 with (meth)acrylic acid.

6. A urethane alkyl(meth)acrylate composition obtained by the reaction of (a) a polycarbonate-polyol composition according to claim 1 with (b) an ethylenically unsaturated mono isocyanate obtained by the reaction of a hydroxyl alkyl(meth)acrylate with an organic diisocyanate.

7. A photo-curable or electron-beam curable composition comprising as its main component a polycarbonate(meth)acrylate composition according to claim 5.

8. A photo-curable or electron-beam curable composition comprising as its main component a urethane alkyl(meth)acrylate composition according to claim 6.

* * * * *